(12) United States Patent
Appeaning et al.

(10) Patent No.: US 10,731,054 B2
(45) Date of Patent: Aug. 4, 2020

(54) COMPOUND, ADHESIVE ARTICLE, AND METHODS OF MAKING THE SAME

(71) Applicant: 3M INNOVATIVE PROPERTIES COMPANY, St. Paul, MN (US)

(72) Inventors: Maria A. Appeaning, St. Paul, MN (US); Maria A. Boulos, West St. Paul, MN (US); David J. Kinning, Woodbury, MN (US); Georgiy Teverovskiy, St. Louis Park, MN (US); Chetan P. Jariwala, Woodbury, MN (US); Michael L. Steiner, New Richmond, WI (US); Sai Vang, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/312,544

(22) PCT Filed: Jun. 23, 2017

(86) PCT No.: PCT/US2017/039032
§ 371 (c)(1),
(2) Date: Dec. 21, 2018

(87) PCT Pub. No.: WO2018/005285
PCT Pub. Date: Jan. 4, 2018

(65) Prior Publication Data
US 2019/0330498 A1    Oct. 31, 2019

Related U.S. Application Data

(60) Provisional application No. 62/384,863, filed on Sep. 8, 2016, provisional application No. 62/356,027, filed on Jun. 29, 2016.

(51) Int. Cl.
*C09J 7/40* (2018.01)
*C09J 7/38* (2018.01)
(Continued)

(52) U.S. Cl.
CPC ............ *C09J 7/401* (2018.01); *C08K 5/3462* (2013.01); *C09D 183/04* (2013.01); *C09J 7/201* (2018.01);
(Continued)

(58) Field of Classification Search
None
See application file for complete search history.

(56) References Cited

U.S. PATENT DOCUMENTS 2,823,218 A   2/1958   Speier
2,970,150 A   1/1961   Bailey
(Continued)

FOREIGN PATENT DOCUMENTS

CA    2545903       2/2015
CN    103261356 A   8/2013
(Continued)

OTHER PUBLICATIONS

Kirk-Othmer, "Encyclopedia of Chemical Technology", 4th Edition, Supplement Volume, John Wiley and Sons, New York, 1998, pp. 253-255.
(Continued)

*Primary Examiner* — Frank D Ducheneaux
(74) *Attorney, Agent, or Firm* — Bradford B. Wright

(57) ABSTRACT

A method of making an adhesive article comprises three steps. First, a backing is provided having first and second opposed major surfaces with respective first and second silicone release layers disposed thereon. The second silicone release layer further comprises a compound represented by
(Continued)

the formula: $R^1$ represents a divalent hydrocarbon radical having from 2 to 40 carbon atoms or covalent bond. $R^2$ represents a monovalent or divalent poly(dimethylsiloxane) moiety. X represents —NH— or a covalent bond. $R_f$ represents a perfluorinated group having from 3 to 5 carbon atoms. y is 1 or 2. Second, an adhesive layer is disposed onto the first silicone release layer. Third, the adhesive layer is exposed to E-beam radiation within a process chamber containing oxygen to provide a crosslinked adhesive layer. An adhesive article made by the method and the compound are also disclosed.

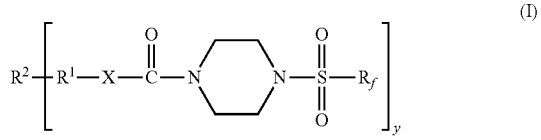

(I)

16 Claims, 2 Drawing Sheets

(51) Int. Cl.
 *C09D 183/04* (2006.01)
 *C08K 5/3462* (2006.01)
 *C09J 7/20* (2018.01)
(52) U.S. Cl.
 CPC ........... *C09J 7/38* (2018.01); *C09J 2201/606* (2013.01); *C09J 2203/30* (2013.01); *C09J 2205/31* (2013.01); *C09J 2433/00* (2013.01); *C09J 2483/005* (2013.01)

(56) References Cited

U.S. PATENT DOCUMENTS

| | | | |
|---|---|---|---|
| 3,159,601 A | 12/1964 | Ashby |
| 3,159,662 A | 12/1964 | Ashby |
| 3,220,972 A | 11/1965 | Lamoreaux |
| 3,344,111 A | 9/1967 | Chalk |
| 3,436,366 A | 4/1969 | Modic |
| 3,708,296 A | 1/1973 | Schlesinger |
| 3,715,334 A | 2/1973 | Karstedt |
| 3,814,730 A | 6/1974 | Karstedt |
| 3,814,731 A | 6/1974 | Nitzsche |
| 3,882,083 A | 5/1975 | Berger |
| 4,069,055 A | 1/1978 | Crivello |
| 4,162,356 A | 7/1979 | Grenoble |
| 4,216,288 A | 8/1980 | Crivello |
| 4,250,311 A | 2/1981 | Crivello |
| 4,279,717 A | 7/1981 | Eckberg |
| 4,348,454 A | 9/1982 | Eckberg |
| 4,504,645 A | 3/1985 | Melancon |
| 4,600,484 A | 7/1986 | Drahnak |
| 4,609,574 A | 9/1986 | Keryk |
| 4,921,882 A | 5/1990 | Senich |
| 4,985,274 A | 1/1991 | Wright |
| 5,077,353 A | 12/1991 | Culbertson |
| 5,332,797 A | 7/1994 | Kessel |
| 2,245,622 A | 9/1995 | Boardman |
| 5,451,622 A | 9/1995 | Boardman |
| 5,520,978 A | 5/1996 | Boardman |
| 5,554,664 A | 9/1996 | Lamanna |
| 5,637,368 A | 6/1997 | Cadalbert |
| 5,932,352 A | 8/1999 | Higgins |
| 6,103,152 A | 8/2000 | Gehlsen |
| 6,146,751 A | 11/2000 | Chen et al. |
| 6,204,350 B1 | 3/2001 | Liu |
| 6,569,914 B2 | 5/2003 | Zoellner |
| 6,677,030 B2 | 1/2004 | Thakkar |
| 6,780,484 B2 | 8/2004 | Kobe |
| 6,835,422 B2 | 12/2004 | Kobe |
| 7,279,210 B2 | 10/2007 | Hulteen |
| RE42,048 E | 1/2011 | Gehlsen |
| 8,822,560 B2 | 9/2014 | Seth |
| D746,000 S | 12/2015 | Daniels |
| 2003/0186013 A1 | 10/2003 | Dhaler |
| 2011/0206924 A1 | 8/2011 | Liu |
| 2011/0303120 A1 | 12/2011 | Zoller |
| 2013/0018145 A1 | 1/2013 | Seth |
| 2013/0059105 A1 | 3/2013 | Wright |
| 2014/0015894 A1 | 1/2014 | Sisler et al. |
| 2015/0030839 A1 | 1/2015 | Satrijo |

FOREIGN PATENT DOCUMENTS

| | | |
|---|---|---|
| CN | 303464560 | 11/2015 |
| EP | 1 305 377 | 9/2006 |
| JP | H04-214470 A | 8/1992 |
| WO | WO 1998-38262 | 9/1998 |
| WO | WO 1998-40439 | 9/1998 |
| WO | WO 2002-062913 | 8/2002 |
| WO | WO 2014/016657 A1 | 1/2014 |
| WO | WO 2016-182803 | 11/2016 |
| WO | WO 2017-100045 | 6/2017 |
| WO | WO 2018-005190 | 1/2018 |
| WO | WO 2018-005287 | 1/2018 |
| WO | WO 2018-048635 | 3/2018 |

OTHER PUBLICATIONS

Satas, Handbook of Pressure Sensitive Adhesive Technology, 585-642 (1989).
International Search Report for PCT International Application No. PCT/US2017/039032, dated Sep. 27, 2017, 4pgs.

COMPOUND, ADHESIVE ARTICLE, AND METHODS OF MAKING THE SAME

CROSS-REFERENCE TO RELATED APPLICATIONS

This application is a national stage filing under 35 U.S.C. 371 of International Application PCT/US2017/039032, filed Jun. 23, 2017, which claims the benefit of U.S. Provisional Application No. 62/384,863, filed Sep. 8, 2016 and U.S. Provisional Application No. 62/356,027, filed Jun. 29, 2016.

TECHNICAL FIELD

The present disclosure broadly relates to fluorinated compositions, adhesive articles, and methods of making them.

BACKGROUND

Adhesive tape comes in many varieties; for example, single-sided or double-sided tape, typically wound into a roll. Double-sided adhesive tape (also termed "adhesive transfer tapes") has adhesive properties on both sides, generally covered by a liner to protect the adhesive, which is removed prior to when the adhesive layer is bonded to a substrate. In some embodiments, a double-sided release liner is used, wherein a first release layer is coated on a first major surface of a backing, and a second release layer is coated on a second major surface of the backing opposite the first major surface. Typically, the first and second release layers are designed to have different release properties to facilitate dispensing the tape in roll form. For example, the first release layer may bind somewhat more tightly to the adhesive layer than the second release layer in order to achieve a clean unwind of the roll.

Methods of producing double-sided adhesive tape can be relatively simple, and one method of production and the resulting structure is as follows. A layer of an adhesive composition is readied and extruded, or otherwise coated by some acceptable method, onto the first release layer of the release liner. For high performance adhesive tapes, the adhesive composition is often then crosslinked (e.g., chemically, by visible or ultraviolet light, or by electron beam radiation). Next, the double-sided release liner and adhesive construction is wound into a roll such that the adhesive layer is sandwiched between the first and second release layers.

Production of double-sided adhesive tape by this method is desirable, but significant problems are encountered when electron beam ("E-Beam") radiation is used to crosslink the adhesive polymer. E-Beam radiation is advantageous as a method of crosslinking because it is effective to crosslink adhesive polymers that have high amounts of pigments or fillers, and/or adhesive films of greater thicknesses. In tape constructions with a single double-sided liner, it is typically necessary to perform the electron beam (E-Beam) exposure step with a major surface of the silicone release layer exposed (the exposed surface) to the ambient environment of the E-Beam processing chamber. If the exposed surface of the silicone release layer is exposed to E-Beam radiation ("E-Beam treated") before winding into a roll, the release properties of the silicone release layer as adhered to the adhesive layer itself are typically altered in a deleterious fashion.

Moreover, in this configuration the adhesive bond between the adhesive layer and the release layer onto which it is subsequently wound tends to increase over time, leading to unpredictable product performance. This can create an undesirable situation in the final product wherein the adhesion of the adhesive layer to both release layers is comparable, resulting in what is known as "liner confusion". In some cases, the release liner cannot even be removed. This is known as "liner blocking". Even when the adhesive material is E-Beam treated directly (i.e., not through a release liner), the side of the silicone release layer opposite the adhesive material will typically be affected if the radiation penetrates through the liner.

One solution to this problem has been to manufacture the double-sided adhesive tape on a temporary liner, crosslink the adhesive with E-Beam radiation, and then replace the temporary release liner with another release liner before it is packaged into the final product. However, this solution is unacceptable because it adds to the complexity of the process, increases waste of the process, and adds the additional cost of another liner. Therefore, there is a need for a release liner that can be E-Beam treated while still maintaining essentially the same pre-E-Beam treated release characteristics so that it need not be replaced before the consumer can utilize the final product.

SUMMARY

Without wishing to be bound by theory, Applicants believe that the detrimental effect of E-beam exposure on the open side of the adhesive layer (discussed above) and exposed silicone release layer leads to formation of various chemical species (e.g., peroxide groups and/or peroxy radicals) that chemically transform the adhesive and release material surfaces as well as their interface over time, thereby contributing to the problems enumerated above.

Advantageously, the present disclosure describes methods of overcoming the aforementioned problems, without the need for a costly temporary release liner.

Accordingly, in one aspect the present disclosure provides a method of making an adhesive article, the method comprising:

providing a backing having first and second opposed major surfaces, wherein a first silicone release layer is disposed on the first major surface, wherein a second silicone release layer is disposed on the second major surface, and wherein the second silicone release layer further comprises a compound represented by the formula:

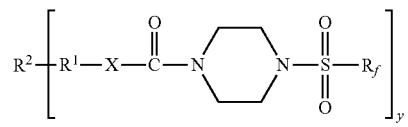

wherein
  $R^1$ represents a divalent hydrocarbon radical having from 2 to 40 carbon atoms or covalent bond;
  $R^2$ represents a monovalent or divalent poly(dimethylsiloxane) moiety;
  X represents —NH— or a covalent bond;
  $R_f$ represents a perfluorinated group having from 3 to 5 carbon atoms; and
  y is 1 or 2;
disposing an adhesive layer onto the first silicone release layer; and
exposing at least the adhesive layer to electron beam radiation within a process chamber thereby providing a crosslinked adhesive layer, wherein the process chamber contains oxygen, wherein the second silicone release layer is exposed to the oxygen during crosslinking of the adhesive layer.

In another aspect, the present disclosure provides an adhesive article made according to the preceding method of the present disclosure.

In yet another aspect, the present disclosure provides an adhesive article comprising: a backing having first and second opposed major surfaces, wherein a first silicone release layer is disposed on the first major surface, wherein a second silicone release layer is disposed on the second major surface, and wherein the second silicone release layer further comprises a compound represented by the formula:

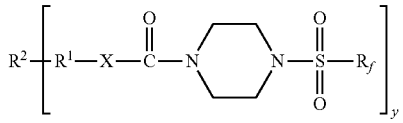

wherein
$R^1$ represents a divalent hydrocarbon radical having from 2 to 40 carbon atoms or covalent bond;
$R^2$ represents a monovalent or divalent poly(dimethylsiloxane) moiety;
X represents —NH— or a covalent bond;
$R_f$ represents a perfluorinated group having from 3 to 5 carbon atoms; and
y is 1 or 2; and
an adhesive layer sandwiched between the first and second release layers.

In yet another aspect, the present disclosure provides a compound represented by the formula:

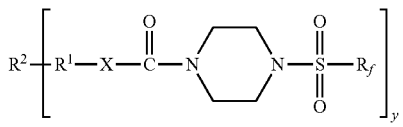

wherein
$R^1$ represents a divalent hydrocarbon radical having from 2 to 40 carbon atoms or covalent bond;
$R^2$ represents a monovalent or divalent poly(dimethylsiloxane) moiety;
X represents —NH— or a covalent bond;
$R_f$ represents a perfluorinated group having from 3 to 5 carbon atoms; and
y is 1 or 2.

As used herein:
The chemical group "Me" refers to methyl.
The term "moiety" refers to a contiguous portion of a molecule which may be a monovalent group or a polyvalent group (e.g., a divalent group).

The term "pressure-sensitive adhesive" (PSA) refers to an adhesive characterized by being normally tacky at room temperature (e.g., 20 degrees Celsius (° C.)) and forming a bond to a surface by the application of, at most, very light finger pressure. PSAs possess a balance of viscoelastic and elastic properties which result in a four-fold balance of adhesion, cohesion, stretchiness and elasticity. They have sufficient cohesiveness and elasticity so that they can be handled and removed from surfaces without leaving a residue even though they are tacky. PSAs do not embrace compositions merely because they are sticky or adhere to a substrate.

The term "perfluorinated" in reference to a chemical species (e.g., group or molecule) means that all hydrogen atoms in the species have been replaced by fluorine.

The term "siliconized release liner" refers to a liner (e.g., a tape or sheet) having silicone release layers on opposed major surfaces thereof.

Features and advantages of the present disclosure will be further understood upon consideration of the detailed description as well as the appended claims.

Figure 1:
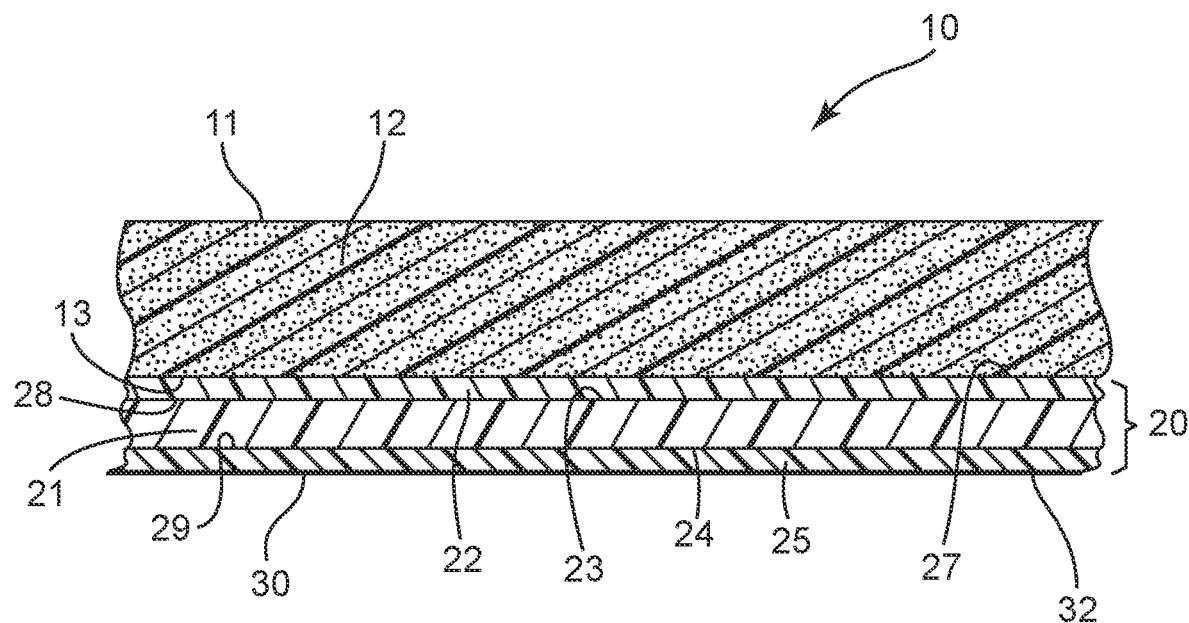
FIG. 1 is a schematic representation of a vertical cross-section of an exemplary double-sided adhesive tape according to the present disclosure.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

FIG. 1 depicts a vertical cross-section of one configuration of a double-sided adhesive tape 10 after its production and before it has been packaged. The double-sided adhesive tape 10 includes an adhesive layer 12. Polymers that can be used in the adhesive layer 12 are discussed more fully below. The adhesive layer 12 is generally formed in a sheet and has a first surface 11 and a second surface 13. When the double-sided adhesive tape 10 is produced, the method of production leaves the first surface 11 of the adhesive layer 12 uncovered.

The double-sided adhesive tape 10 also includes a siliconized release liner 20. The siliconized release liner 20 includes a backing 21. Suitable materials for the backing 21 are discussed more fully below. The backing 21 has a first surface 23 and a second surface 24. The siliconized release liner 20 includes a first silicone release layer 22 and a second silicone release layer 25. While FIG. 1 shows siliconized release liner 20 with first silicone release layer 22, backing 21 may have sufficient liner release such that first silicone release layer 22 is not necessary. If used, first silicone release layer 22 is applied to the first surface 23 of the backing 21. The second silicone release layer 25 is applied to the second surface 24 of the backing 21. The first silicone release layer 22 has a release side 27 next to the second surface 13 of the adhesive layer 12 and a backing side 28. The release side 27 of the first silicone release layer 22 also defines a first surface 23 of siliconized release liner 20. The second silicone release layer 25 has a backing side 29 and a non-backing side 30. The non-backing side 30 of the second silicone release layer 25 also defines a second surface 32 of siliconized release liner 20. The first and second silicone release layers 22 and 25 can be composed of the same or different material. Preferably, the first and second silicone release layers (22, 25) are composed of different materials.

Figure 2:
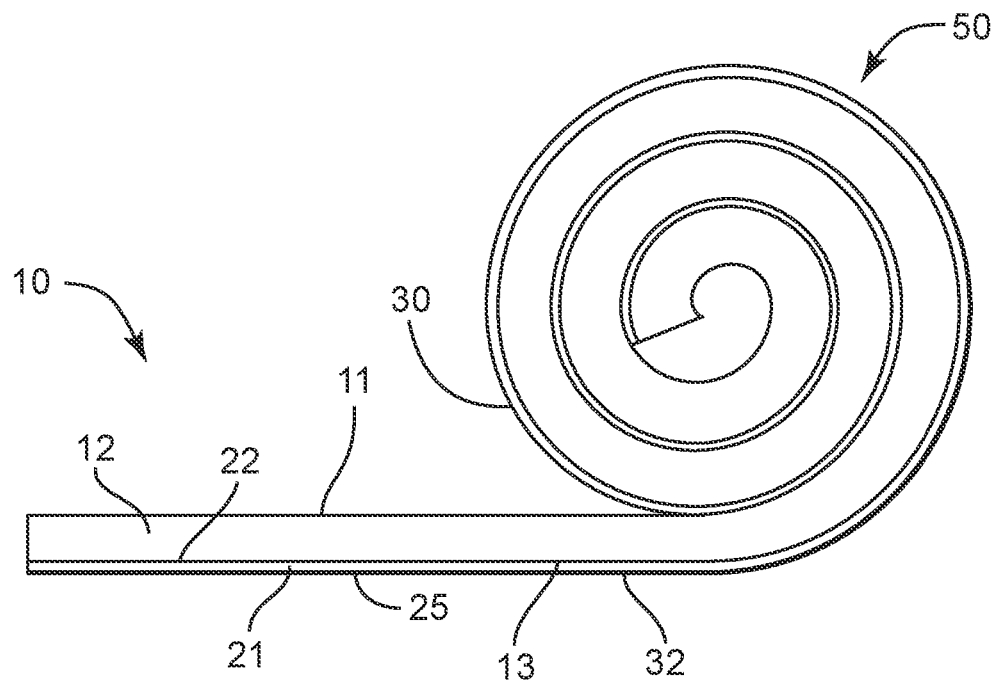
FIG. 2 is a schematic representation of an exemplary method of winding up double-sided adhesive tape in to a roll.

FIG. 2 depicts one method of readying a double-sided adhesive tape for packaging. The double-sided adhesive tape 10 is wound around itself into a roll to form a packageable article 50. In use, double-sided adhesive tape is unwound, optionally cut, and applied to a surface with the exposed side of the adhesive layer 12 (the first surface 11 discussed above) and the backing 21 is then removed. Optionally, the second surface 13 of the adhesive layer 12 is applied to a second surface after the backing 21 is removed. This method of forming a packageable article 50 results in portions of the double-sided adhesive tape 10 interacting with other portions of the double-sided adhesive tape 10. Once the double-sided adhesive tape 10 begins to be wound on itself, the first surface 11 of the adhesive layer 12 comes into contact with the non-backing side 30 of the second silicone release layer 25 (also referred to as the second surface 32 of siliconized release liner 20).

The contact of the non-backing side 30 of the second silicone release layer 25 and the first surface 11 of the adhesive layer 12 becomes important when the packageable article 50 is unrolled to use the double-sided adhesive tape 10. It is desirable that the adhesive layer 12 and the siliconized release liner 20 maintain contact through the second surface 13 instead of the first surface 11 of the adhesive layer 12. Therefore, the siliconized release liner 20 should release preferentially from the first surface 11 before it releases from the second surface 13 of the adhesive layer 12. Thus, the siliconized release liner 20 should have a liner release from the first surface 11 of the adhesive layer 12 that is sufficiently different from the liner release from the second surface 13 of the adhesive layer 12. The second surface 32 of siliconized release liner 20 and adhesive layer 12 are configured so that this differential effect is developed. Preferably, the ratio of release forces from the first release layer and the second release layer is at least 2:1, more preferably at least 3:1.

Figure 3:
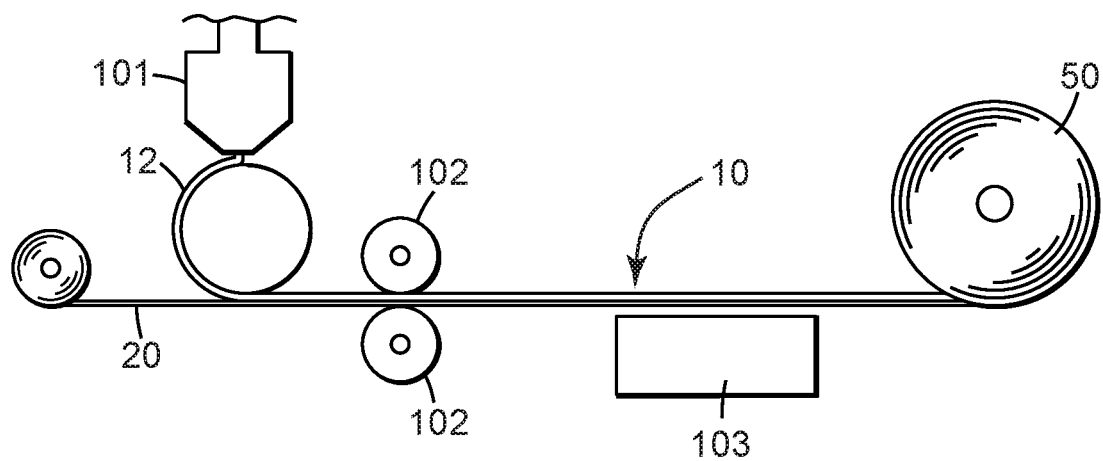
FIG. 3 is a schematic representation of an exemplary process for making a double-sided adhesive tape according to the present disclosure.

FIG. 3 schematically depicts one method of producing double-sided adhesive tape 10 and forming it into a packageable article 50. The adhesive layer 12 is dispensed from a dispenser 101 onto a siliconized release liner 20. Next the siliconized release liner 20 and the adhesive layer 12 are laminated together between a pair of nip rollers 102 to form the double-sided adhesive tape 10. Then, the double-sided adhesive tape 10 is exposed to radiation from a radiation source 103 through the siliconized release liner 20 to cause crosslinking of the adhesive layer 12. The radiation source 103 is preferably an E-Beam source. The double-sided adhesive tape 10 is then formed into a packageable article 50 by winding upon itself to form a roll.

The siliconized release liner has a backing with first and second opposed major surfaces (23, 24). First and second silicone release layers (22, 25) are disposed on the respective surfaces of the backing 21.

Suitable materials for the backing 21 include, for example, polymeric films, such as polyester films (e.g., polyethylene terephthalate films) and polyolefin films (e.g., polyethylene films, polypropylene films, biaxially-oriented polypropylene films (BOPP films)), metallized film, sealed paper (e.g., polyethylene-coated paper, metallized paper, and clay-coated paper), and paper.

The first silicone release layer 22 on the first surface 23 of the backing 21 can include conventional silicone release materials, including those that are known in the art such as, e.g., chemistries using the following curing mechanisms: condensation cure (e.g., hydrolytic), addition cure (e.g., hydrosilation-based), free-radical cure, cationic cure, and triggered condensation cure. Details concerning these silicone chemistries can be found in, for example, U.S. Pat. No. 4,504,645 (Melancon), U.S. Pat. No. 4,600,484 (Drahnak), and U.S. Pat. No. 7,279,210 (Hulteen et al.), PCT Publication No. WO 98/40439 (Liu et al.) and Handbook of Pressure Sensitive Adhesive Technology, 3rd ed., Chapters 23 and 24, Van Nostrand Reinhold Co., Inc. (1989).

The second silicone release layer 25 on the second surface 24 of the backing 21 can also include conventional silicone release materials. Preferably, the second silicone release layer materials comprise tightly crosslinked siloxane networks with minimal polar or reactive functionalities, especially free-radical reactive functionalities. It is known that chemical bond cleavage will occur from excited states in an irradiated polymer when a polymer is exposed to E-Beam radiation, which leads to free radical formation. The free radicals formed have a short life and will either recombine with other free-radicals to lose their reactivity, react with a polymer, or react with other functional groups to create free radicals having a longer life. The relatively long-lived free radicals can further react with molecular oxygen, for example, and give a relatively stable peroxide compound when the irradiated material is exposed to an oxygen containing environment (i.e., radiation-oxidation).

Thus formed peroxides have a relatively longer life, so that they may be able to migrate to the adhesive-release interface to further react (or interact) with the adhesive. This causes higher liner release values (meaning that a relatively undesirable high unwind force is required) or liner blocking. To minimize liner blocking and make the second silicone release layer 25 function in the desired way, the silicone release layer material should contain minimal free-radical-reactive functionalities, such as the acrylate, methacrylate, vinyl, and silicon hydride functionalities.

The present inventors have found, unexpectedly, that a release liner coated with a silicone release composition containing certain fluorinated additives, provides acceptable release after exposing the release layer to electron beam radiation.

Silicone or polydimethylsiloxane is the most important and widely used release material. To reduce or avoid silicone transfer to the adhesive layer the silicone release layer is generally crosslinked. Crosslinking can be either physical crosslinking or chemical crosslinking. Chemical crosslinking is also referred to as "curing" in this patent application.

Among the silicone cure chemistries, free-radical cure, addition cure, and condensation cure all may give crosslinked networks.

Crosslinked silicones are typically derived from at least one corresponding reactive silicone precursor that includes two or more reactive groups. The reactive groups preferably include epoxy, acrylate, silane, silanol, or ethylenically-unsaturated (e.g., vinyl or hexenyl) groups. Silicone precursors that include two or more epoxy or acrylate groups will typically homopolymerize without the need for a separate crosslinker. The silicone precursors that include two or more, silanol, or ethylenically-unsaturated groups use a separate crosslinker, such as a hydride-functional silicone crosslinker. Alternatively, a silanol, alkoxysilane, or acyloxysilane-functional silicone precursor can be reacted with an alkoxy-functional crosslinker, as described in U.S. Pat. No. 6,204,350 (Liu et al.).

In some embodiments, the number average molecular weight between functional groups of the silicone base precursor is less than about 500000 g/mol, preferably less than about 20000 or less. In some embodiments, the number average molecular weight between functional groups is at least about 500 g/mol, and often at least about 2,000 g/mol.

Suitable epoxy-functional silicone precursors are described, for example, in U.S. Pat. No. 4,279,717 (Eckberg et al.) and U.S. Pat. No. 5,332,797 (Kessel et al.). Examples of epoxy-functional silicone precursors include, for example, those available as SILFORCE UV 9400, SILFORCE UV 9315, SILFORCE UV 9430, SILFORCE UV 9600, all available from Momentive, Columbus, Ohio, and as SILCOLEASE UV200 series from Bluestar Silicones, East Brunswick, N.J.

Suitable acrylate-functional silicone precursors are described, for example, in U.S. Pat. No. 4,348,454 (Eckberg). Examples of acrylate-functional silicone precursors include, for example, those available as SILCOLEASE UV100 Series, from Bluestar Silicones, and those available as TEGO RC 902, TEGO RC 922, and TEGO RC 711, from Evonik Industries, Parsippany, N.J.

Suitable silanol-functional silicone polymers are well known and are available from a variety of sources including, e.g., those available as DMS-S12 and DMS-S21 from Gelest, Inc., Morrisville, Pa.

Suitable ethylenically-unsaturated functional silicone precursors include polydimethylsiloxanes with pendant and/or terminal vinyl groups, as well as polydimethylsiloxanes with pendant and/or terminal hexenyl groups. Suitable hexenyl functional silicones are described, for example, in U.S. Pat. No. 4,609,574 (Keryk et al.). An example of a hexenyl-functional silicone includes, for example, one available as SYL-OFF 7677, available from Dow Corning, Midland, Mich. Suitable vinyl-functional silicones are described, for example, in U.S. Pat. No. 3,814,731 (Nitzsche et al.) and U.S. Pat. No. 4,162,356 (Grenoble), and are available from a wide variety of sources. Examples of vinyl-terminated polydimethylsiloxane include those available as DMS-V21 (molecular weight=6000) and DMS-V25 (molecular weight=17,200), from Gelest Inc. Suitable vinyl-functional silicone polymers are also available as SYL-OFF from Dow Corning. An exemplary material containing end-blocked and pendant vinyl-functional silicone polymers is SYL-OFF 7680-020 polymer from Dow Corning.

Suitable hydride-functional silicone crosslinkers are described, for example, in U.S. Pat. No. 3,814,731 (Nitzsche et al.) and U.S. Pat. No. 4,162,356 (Grenoble). Suitable crosslinkers are well known, and one of ordinary skill in the art would be readily able to select an appropriate crosslinker, including identifying appropriate functional groups on such crosslinkers, for use with a wide variety of silicone-based polymers. For example, hydride-functional crosslinkers are available as SYL-OFF from Dow Corning, including those available as SYL-OFF 7048 and SYL-OFF 7678. Other exemplary hydride-functional crosslinkers include those available as SS4300C and SL4320, available from Momentive Performance Materials, Albany, N.Y.

The hydride equivalent weight of a hydride-functional silicone crosslinker is typically at least about 60 grams per equivalent (g/eq), and typically no greater than about 150 g/eq.

In embodiments including a silanol-functional silicone precursor and a hydride functional crosslinker, the equivalent ratio of hydride groups to silanol groups is preferably at least about 1.0 (1:1) and often no more than about 25.0 (25:1).

In embodiments including an ethylenically-unsaturated functional silicone precursor and a hydride functional crosslinker, the equivalent ratio of hydride groups to ethylenically-unsaturated groups is preferably at least about 1.0 (1:1), and more preferably at least about 1.1. Often, the equivalent ratio is no more than about 2.0 (2:1) and more often no more than about 1.5.

Suitable alkoxy-functional crosslinkers, and conditions of crosslinking, including relative amounts of crosslinker, are described in U.S. Pat. No. 6,204,350 (Liu et al.).

The crosslinked (e.g., cured) silicone described herein may be derived from one or more reactive silicone precursors crosslinked using a catalyst. Examples of suitable catalysts are described, for example, in U.S. Pat. No. 5,520,978 (Boardman et al.). Preferably, the catalyst is a platinum or rhodium catalyst for vinyl- and hexenyl-functional silicones. Preferably, the catalyst is a tin catalyst for silanol functional silicones. Examples of commercially available platinum catalysts include, but are not limited to, those available under the trade designation SIP6831.2 (a platinum-divinyltetramethyldisiloxane catalyst complex in xylene; 2.1-2.4 weight percent platinum concentration), available from Gelest Inc. The amount of Pt is typically about 60 to about 150 parts per million (ppm) by weight.

Other components used in making silicone release layers include, for example, inhibitors such as, e.g., a diallyl maleate inhibitor available as SL 6040-D1 01P, from Momentive, MQ resins such as that available as SYL-OFF 7210 RELEASE MODIFIER from Dow Corning, and anchorage additives such as that available as SYL-OFF 297 available from Dow Corning.

Improved release stability for siliconized release liners that are exposed to E-Beam radiation in the presence of oxygen is achieved by including at least one compound represented by Formula (I), below:

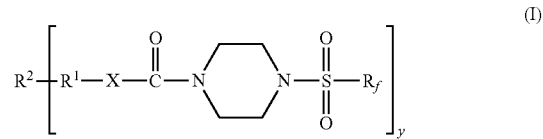

(I)

in the silicone release layer formulation, e.g., the first silicone release layer in adhesive articles according to the present disclosure.

$R^1$ represents a divalent hydrocarbon radical having from 2 to 40 carbon atoms or a covalent bond. $R^1$ can be aliphatic or aromatic, cyclic, linear, or branched. In some embodiments, $R^1$ has 6 carbon atoms and is aromatic (e.g., p-phenylene, m-phenylene, or o-phenylene). In some embodiments, $R^1$ has 2 to 20 carbon atoms, 2 to 12 carbon atoms, 2 to 6 carbon atoms, or 2 to 4 carbon atoms. Examples include ethylene (i.e., —CH$_2$CH$_2$—), propane-1,3-diyl, propane-1,2-diyl, butane-1,4,-diyl, hexane-1,6-diyl, cyclohexane-1,6-diyl, dodecane-1,12-diyl, dodecane-1,6-diyl, hexadecane-1,16-diyl, eicosane-1,20-diyl.

$R^2$ represents a monovalent (y=1) or divalent poly(dimethylsiloxane) (y=2) moiety. In some embodiments, the polydimethylsiloxane moiety has a number average ($M_n$) molecular weight of from at least 250 g/mole (g/mol), at least 500 g/mol, at least 1000 g/mol, at least 2000 g/mol, or at least 2500 g/mol up to at least 5000 g/mole, at least 7500 g/mol, or more. Alternatively, or in addition, in some embodiments, the polydimethylsiloxane moiety contains an average of from at least 2, at least 3, at least 4, at least 5, at least 10, at least 20, at least 30, or even at least 40 silicon atoms up to 50 silicon atoms, or more.

X represents —NH— or a covalent bond.

$R_f$ represents a perfluorinated group having from 3 to 5 carbon atoms. Examples include perfluoro-n-propyl, perfluoro-iso-propyl, perfluoro-n-butyl, perfluoro-iso-butyl, perfluoro-t-butyl, perfluoro-n-pentyl, perfluoro-sec-pentyl, and perfluoro-neo-pentyl.

y is 1 or 2.

Compounds according to Formula (I) can be made according to conventional synthetic approaches. For example, the fluorinated acrylamide shown in Formula II (below), wherein $R_f$ is as described in Formula I (hereinbefore), can be prepared according to the procedures in U.S. Provisional Pat. Appl. No. 62/266,035, filed Dec. 11, 2015, and entitled "FLUOROCHEMICAL PIPERAZINE SULFONAMIDES".

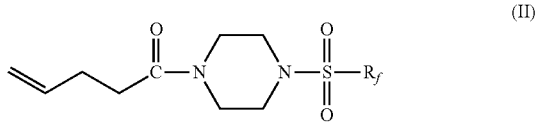

(II)

This fluorinated olefin can be coupled by hydrosilation with a hydrogen-terminated polydimethylsiloxane as shown below:

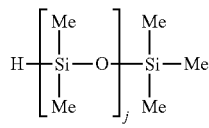

or a α,ω-dihydridopoly(dimethylsiloxane) as shown below:

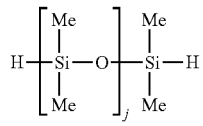

wherein j is an integer greater than or equal to 1, preferably greater than or equal to 2, more preferably greater than or equal to 4. Such coupling reactions result in compounds according to Formula I wherein y=1 and y=2, respectively. The coupling reaction may be carried out in toluene solvent using Karstedt's catalyst (i.e., platinum(0)-1,3-divinyl-1,1,3,3-tetramethyldisiloxane, typically sold as a solution in toluene), for example. Other hydrosilation catalysts may also be used.

Mono- and di-hydride-terminated polydimethylsiloxanes can be prepared according to known methods and/or obtained from commercial suppliers; for example, from Aldrich Chemical Co., Milwaukee, Wis. or Dow Corning, Midland, Mich.

Compounds according to Formula II can be prepared using known organic reactions such as, for example, those disclosed in U.S. Pat. No. 5,451,622 (Boardman et al.). An exemplary method of preparation is by the reaction of fluoroaliphatic sulfonyl fluorides, $R_fSO_2F$, with piperazine followed by reaction of the resulting fluoroaliphatic radical-containing sulfonylpiperazine with various organic reactants (e.g., acid halides having alkenyl groups, isocyanates having alkenyl groups). Analogous reactions for preparing other compounds will be apparent to those of ordinary skill in the art.

Any suitable methods can be used to coat the silicone release layers on the backing. Typical silicone release layer weights are greater than 0.2 g/m² and more typically are from 0.7 g/m² to 2.5 g/m². Liner release values observed with siliconized release liners that have been E-Beam treated vary both with coating weight and the specific backing utilized.

Compounds of Formula I are included in the second silicone release layer in a total amount that is effective to substantially eliminate liner confusion. Preferably, the compound is included in the second silicone release layer in an amount of 0.1 to 10 weight percent, more preferably 0.1 to 6 percent, and even more preferably 0.5 to 6, although other amounts can also be used.

Additives such as for example, fillers, antioxidants, viscosity modifiers, pigments, release modifiers can be added to both the first and second silicone release layers (22 and 25) to the extent that they do not substantially and deleteriously alter the desired properties of the final product.

Once silicone release layer formulations are chosen, the components are mixed and delivered to a coater. Useful coating methods include, for example, bar coating; roll coating (e.g., gravure coating, offset gravure coating (also called 3-roll coating), and 5-roll coating); spray coating; curtain coating; and brush coating.

The silicone release layer formulations are coated directly onto the backing, either from 100% solids or from a solution. Useful backings include, but are not limited to, polyester (e.g., PET), polyolefin (e.g., polyethylene, polypropylene, biaxially oriented polypropylene (BOPP)), polycoated paper, metallized paper, clay sealed paper, and metallized films. The surfaces of the backing may be further treated to enhance silicone release layer anchorage to the backing chemically or physically, for example, with a primer, corona treatment, or flame treatment.

After each curable silicone release layer formulation is coated onto the backing, the coated curable silicone release layer formulation is cured, for example, by ultraviolet (UV) or thermal radiation, depending on the requirements of the system. Examples of useful UV lights include high intensity UV lights, such as H-type lamps (commercially available from Fusion UV Curing Systems, Rockville, Md.) and medium pressure mercury lamps. When solvent-based formulations are used as silicone release layers, treatment in a thermal oven also may be needed before UV curing to remove solvents.

This general procedure works for both the first silicone release layer 22 and second silicone release layer 25. Generally, the first silicone release layer 22 is coated before the second silicone release layer 25. Alternatively, both of the first and second silicone release layers 22, 25 may be coated and cured at the same time.

A variety of different polymer resins, as well as blends thereof, are suitable for forming the adhesive layer 12. The particular resin is selected based upon the desired properties of the final article. An example of a class of polymer resins useful in the adhesive layer 12 can be found in U.S. Pat. No. 6,103,152 (Gehlsen et al.). It may be desirable to blend two or more acrylate polymers having different chemical compositions. A wide range of physical properties can be obtained by manipulation of the type and concentration of the blend components.

One class of polymers useful for the adhesive layer 12 includes acrylate and methacrylate polymers and copolymers. Such polymers are formed, for example, by polymerizing one or more monomeric acrylic or methacrylic esters of non-tertiary alkyl alcohols, with the alkyl groups having from 1 to 20 carbon atoms (e.g., from 3 to 18 carbon atoms). Suitable acrylate monomers include, for example, methyl acrylate, ethyl acrylate, n-butyl acrylate, lauryl acrylate, 2-ethylhexyl acrylate, cyclohexyl acrylate, iso-octyl acrylate, octadecyl acrylate, nonyl acrylate, decyl acrylate, and dodecyl acrylate. The corresponding methacrylates are useful as well. Also useful are aromatic acrylates and methacrylates (e.g., benzyl acrylate and benzyl methacrylate).

Optionally, one or more monoethylenically unsaturated co-monomers may be polymerized with the acrylate or methacrylate monomers. The particular type and amount of co-monomer is selected based upon the desired properties of the polymer. One group of useful co-monomers includes those having a homopolymer glass transition temperature greater than the glass transition temperature of the (meth) acrylate (i.e., acrylate or methacrylate) homopolymer. Examples of suitable co-monomers falling within this group include: acrylic acid; acrylamides; methacrylamides; substituted acrylamides (such as N,N-dimethylacrylamide); itaconic acid; methacrylic acid; acrylonitrile; methacrylonitrile; vinyl acetate; N-vinylpyrrolidone; isobornyl acrylate; cyanoethyl acrylate; N-vinylcaprolactam; maleic anhydride; hydroxyalkyl (meth)acrylates; N,N-dimethylaminoethyl (meth)acrylate; N,N-diethylacrylamide; beta-carboxyethyl acrylate; vinyl esters of neodecanoic, neononanoic, neopentanoic, 2-ethylhexanoic, or propionic acids; vinylidene chloride; styrene; vinyltoluene, and alkyl vinyl ethers.

A second group of monoethylenically unsaturated co-monomers that may be polymerized with the acrylate or methacrylate monomers includes those having a homopolymer glass transition temperature ($T_g$) less than the glass transition temperature of the acrylate homopolymer. Examples of suitable co-monomers falling within this class include ethyloxyethoxyethyl acrylate ($T_g$=−71 degrees Celsius (° C.)) and a methoxypolyethylene glycol 400 acrylate ($T_g$=−65° C.; available from Shin Nakamura Chemical Co., Ltd. as NK Ester AM-90G).

A second class of polymers useful in the adhesive layer 12 includes: semicrystalline polymer resins, such as polyolefins and polyolefin copolymers (e.g., polymer resins based upon monomers having between 2 and 8 carbon atoms, such as low-density polyethylene, high-density polyethylene, polypropylene, and ethylene-propylene copolymers); polyesters and co-polyesters; polyamides and co-polyamides; fluorinated homopolymers and copolymers; polyalkylene oxides (e.g., polyethylene oxide and polypropylene oxide); polyvinyl alcohol; ionomers (e.g., ethylene-methacrylic acid copolymers neutralized with a base); and cellulose acetate. Other examples of polymers in this class include amorphous polymers such as polyacrylonitrile polyvinyl chloride, thermoplastic polyurethanes, aromatic epoxies, polycarbonates, amorphous polyesters, amorphous polyamides, ABS block copolymers, polyphenylene oxide alloys, ionomers (e.g., ethylene-methacrylic acid copolymers neutralized with salt), fluorinated elastomers, and polydimethyl siloxane.

A third class of polymers useful in the adhesive layer 12 includes elastomers containing ultraviolet radiation-activatable groups. Examples include polybutadiene, polyisoprene, polychloroprene, random and block copolymers of styrene and dienes (e.g., SBR), and ethylene-propylene-diene monomer rubber. This class of polymer is typically combined with tackifying resins.

A fourth class of polymers useful in the adhesive layer 12 includes pressure-sensitive and hot melt applied adhesives prepared from non-photopolymerizable monomers. Such polymers can be adhesive polymers (i.e., polymers that are inherently adhesive), or polymers that are not inherently adhesive but are capable of forming adhesive compositions when compounded with components such as plasticizers, or tackifiers. Specific examples include poly-alpha-olefins (e.g., polyoctene, polyhexene, and atactic polypropylene), block copolymer-based adhesives, natural and synthetic rubbers, silicone adhesives, ethylene-vinyl acetate, and epoxy-containing structural adhesive blends (e.g., epoxy-acrylate and epoxy-polyester blends).

The adhesive layer 12 may also optionally have other components in it. Normal additives such as, for example, fillers, antioxidants, viscosity modifiers, pigments, tackifying resins, fibers, and the like can also be added to the adhesive layer 12, to the extent that they do not alter the desired properties of the final product.

A preferred optional additive is a pigment, or a light blocking fillers. Any compound generally used as a pigment can be utilized, as long as the desired properties of the final product are not altered thereby. Exemplary pigments include carbon black and titanium dioxide. The amount of pigment also depends on the desired use of the product. Generally, the concentration of pigment is greater than 0.10% by weight. Preferably, the concentration of pigment is greater than 0.15% by weight, and more preferably greater than 0.18% by weight to give the adhesive layer 12 an opaque color.

The thickness of the adhesive layer 12 varies depending on the use of the product. In the case of certain foam adhesive products, preferably the thickness of adhesive layer 12 is greater than 250 microns. More preferably, the thickness is greater than 500 microns. In the case of a single layer of non-foamed transfer adhesive, the adhesive layer preferably has a thickness of 2 to 5 mils (51 to 127 microns), although other thicknesses may also be used.

The adhesive layer 12 utilized in the invention is at least partially crosslinked by electron beam ("E-beam") radiation, although additional crosslinking means (e.g., chemical, heat, gamma radiation, and/or ultraviolet and/or visible radiation) may also be used. The adhesive layer 12 is crosslinked to impart more desirable characteristics (e.g., increased strength) to the double-sided adhesive tape 10. One method of crosslinking is using electron-beam radiation. E-Beam radiation is advantageous because it can crosslink polymers that other methods cannot, such as highly pigmented adhesives, adhesives with fillers, and relatively thick layers of adhesives.

E-Beam radiation causes crosslinking of the adhesive layer by initiating a free-radical chain reaction. Ionizing particulate radiation from the E-Beam is absorbed directly in the polymer and generates free radicals that initiate the crosslinking process. Generally, electron energies of at least about 100 kiloelectron volts (keV) are necessary to break chemical bonds and ionize, or excite, components of the polymer system. The scattered electrons that are produced lead to a large population of free radicals dispersed throughout the adhesive. These free radicals initiate crosslinking reactions (e.g., free-radical polymerization, radical-radical coupling), which results in a three-dimensionally crosslinked polymer.

An E-Beam processing unit supplies the radiation for this process. Generally, a processing unit includes a power supply and an E-Beam acceleration tube. The power supply increases and rectifies the current, and the accelerator generates and focuses the E-Beam and controls the scanning. The E-Beam may be produced, for example, by energizing a tungsten filament with high voltage. This causes electrons to be produced at high rates. These electrons are then concentrated to form a high energy beam and are accelerated to full velocity inside the electron gun. Electromagnets on the sides of the accelerator tube allow deflection, or scanning, of the beam.

Scanning widths and depths typically vary from about 61-183 centimeters (cm) to about 10-15 cm, respectively. The scanner opening is covered with a thin metal foil, usually titanium, which allows passage of electrons, but maintains a high vacuum in the processing chamber. Characteristic power, current, and dose rates of accelerators are about 200-500 keV, about 25-200 milliamps (mA), and about 1-10 megarads (Mrads), respectively. To minimize peroxide formation, the process chamber should be kept at as low an oxygen content as is practical, for example, by nitrogen purging, although this is not a requirement.

After e-beam treatment the resultant double-sided adhesive tape can be wound into a roll, e.g., as shown in FIG. 3. Further converting steps such as, for example, slitting and/or packaging may also be carried out at this point.

SELECT EMBODIMENTS OF THE PRESENT DISCLOSURE

In one aspect, the present disclosure provides a method of making an adhesive article, the method comprising:

providing a backing having first and second opposed major surfaces, wherein a first silicone release layer is disposed on the first major surface, wherein a second silicone release layer is disposed on the second major surface, and wherein the second silicone release layer further comprises a compound represented by the formula:

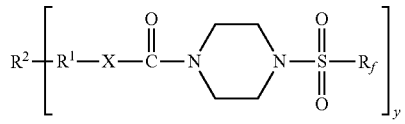

wherein
$R^1$ represents a divalent hydrocarbon radical having from 2 to 40 carbon atoms or covalent bond;
$R^2$ represents a monovalent or divalent poly(dimethylsiloxane) moiety;
X represents —NH— or a covalent bond;
$R_f$ represents a perfluorinated group having from 3 to 5 carbon atoms; and
y is 1 or 2;
disposing an adhesive layer onto the first silicone release layer; and
exposing at least the adhesive layer to electron beam radiation within a process chamber thereby providing a crosslinked adhesive layer, wherein the process chamber contains oxygen, wherein the second silicone release layer is exposed to the oxygen during crosslinking of the adhesive layer.

In a second embodiment, the present disclosure provides a method according to the first embodiment, wherein the electron beam radiation is directed from opposing directions at both the adhesive layer and the second silicone release layer, respectively.

In a third embodiment, the present disclosure provides a method according to the first or second embodiment, further comprising winding the crosslinked adhesive layer onto the second silicone release layer.

In a fourth embodiment, the present disclosure provides an adhesive article according to any one of the first to third embodiments, wherein the crosslinked adhesive layer is a pressure-sensitive adhesive layer.

In a fifth embodiment, the present disclosure provides an adhesive article made according to any one of the first to fourth embodiments.

In a sixth embodiment, the present disclosure provides an adhesive article comprising: a backing having first and second opposed major surfaces, wherein a first silicone release layer is disposed on the first major surface, wherein a second silicone release layer is disposed on the second major surface, and wherein the second silicone release layer further comprises a compound represented by the formula:

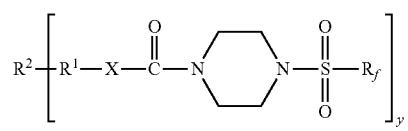

wherein
$R^1$ represents a divalent hydrocarbon radical having from 2 to 40 carbon atoms or covalent bond;
$R^2$ represents a monovalent or divalent poly(dimethylsiloxane) moiety;
X represents —NH— or a covalent bond;
$R_f$ represents a perfluorinated group having from 3 to 5 carbon atoms; and
y is 1 or 2; and
an adhesive layer sandwiched between the first and second release layers.

In a seventh embodiment, the present disclosure provides an adhesive article according to the sixth embodiment, wherein $R_f$ is perfluorobutyl.

In an eighth embodiment, the present disclosure provides an adhesive article according to according to the sixth or seventh embodiment, wherein $R^1$ has 6 carbon atoms and is aromatic.

In a ninth embodiment, the present disclosure provides an adhesive article according to according to the sixth or seventh embodiment, wherein $R^1$ has from 2 to 12 carbon atoms.

In a tenth embodiment, the present disclosure provides an adhesive article according to any one of the sixth to ninth embodiments, wherein $R^2$ is a monovalent or divalent poly(dimethylsiloxane) moiety.

In an eleventh embodiment, the present disclosure provides an adhesive article according to any one of the sixth to tenth embodiments, wherein the adhesive layer is a pressure-sensitive adhesive layer.

In a twelfth embodiment, the present disclosure provides a compound represented by the formula:

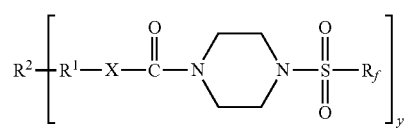

wherein
$R^1$ represents a divalent hydrocarbon radical having from 2 to 40 carbon atoms or covalent bond;
$R^2$ represents a monovalent or divalent poly(dimethylsiloxane) moiety;

X represents —NH— or a covalent bond;
R$_f$ represents a perfluorinated group having from 3 to 5 carbon atoms; and
y is 1 or 2.

In a thirteenth embodiment, the present disclosure provides a compound according to the twelfth or thirteenth embodiment, wherein R$_f$ is perfluorobutyl.

In a fourteenth embodiment, the present disclosure provides a compound according to any one of the twelfth or thirteenth embodiment, wherein R$^1$ has 6 carbon atoms and is aromatic.

In a fifteenth embodiment, the present disclosure provides a compound according to any one of the twelfth to fourteenth embodiments, wherein R$^1$ has from 2 to 12 carbon atoms.

In a sixteenth embodiment, the present disclosure provides a compound according to any one of the twelfth to fifteenth embodiments, wherein R$^2$ is a monovalent or divalent poly(dimethylsiloxane) moiety.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. Unless otherwise indicated, materials used in the examples available from commercial suppliers (e.g., Aldrich Chemical Co., Milwaukee, Wis.) and/or can be made by known methods. Materials prepared in the examples were analyzed by NMR spectroscopy and were consistent with the given structures.

TABLE OF MATERIALS USED IN THE EXAMPLES

| DESIGNATION | DESCRIPTION |
| --- | --- |
| Karstedt's Catalyst | Platinum-divinyltetramethyldisiloxane complex in xylene, containing between 2.1 and 2.4 weight percent platinum concentration, available as product code SIP6831.2 from Gelest, Morrisville, Pennsylvania |
| HPMTS | 1,1,1,3,3,5,5-heptamethyltrisiloxane, having a boiling point of 134° C. and a purity of 90%, available from Gelest |
| 4-Pentenoic acid | An olefin terminated, liquid, aliphatic carboxylic acid having a molecular weight of 100.1 g/mol and containing 0.01-0.2 weight percent alpha-tocopherol as stabilizer, available as product code W284300 from Sigma-Aldrich, St. Louis, Missouri |
| 10-Undecenoic acid | An olefin terminated aliphatic carboxylic acid with a molecular weight of 184.28 g/mol, a melting point of 23-25° C., available under the product code W324720 from Sigma-Aldrich |
| PTDMS | Pentamethyldisiloxane, having a boiling point of 86° C., available from Gelest |
| HTPDS400 | A hydride-terminated poly(dimethylsiloxane) having a molecular weight of between 400 and 500 g/mol, a viscosity of 2 to 3 centiStokes, and 0.5 weight percent H, available as product code DMS-H03 from Gelest |
| HTPDS1000 | A hydride-terminated poly(dimethylsiloxane) having a molecular weight of between 1000 and 1100 g/mol, a viscosity of 7 to 10 centiStokes, and 0.2 weight percent H, available as product code DMS-H11 from Gelest |
| HTPDS4000 | A hydride-terminated poly(dimethylsiloxane) having a molecular weight of between 4000 and 5000 grams/mole, a viscosity of 100 centiStokes, and 0.04 weight percent H, available as product code DMS-H11 from Gelest |
| VTSP | A divinyl terminated silicone polymer with viscosity of 250 to 400 centiStokes, a vinyl content of 0.53 to 0.66 weight percent, and containing 150 ppm platinum, and 0.7 weight percent inhibitor, obtained from Dow Corning Corporation, Midland, Michigan |
| HFSX | A liquid, hydride functional polysiloxane crosslinker component, 100% solids and having a viscosity at 25° C. of 30 centiStokes, available under the trade designation SYL-OFF 7678 CROSSLINKER from Dow Corning Corporation, Midland, Michigan |
| IOA | Isooctyl acrylate |
| AA | Acrylic acid |
| FORAL 85 | A tackifier resin, the glycerol ester of highly hydrogenated refined wood rosin having a softening point of 80 to 86° C. and an acid number of between 3 and 10 milligrams KOH/gram resin, available under the trade designation FORAL 85 from Pinova Incorporated, Brunswick, Georgia |
| Primed Polyester Film | A polyester film having a thickness of 51 micrometers (0.002 inches) and being primed on one side, available under the trade designation HOSTAPHAN 3SAB from Mitsubishi Polyester Film Incorporated, Greer, South Carolina |

Test Methods

Coating Weight Determination

The coating weight of silicone release coatings was determined using a Lab X 3000 XRF Spectrometer (Oxford Instruments, Elk Grove Village, Ill.) to measure the silicone coat weight compared to polydimethylsiloxane (PDMS) coated polyester film standards of known coat weights. Results are reported in grams per square meter (gsm).

Extent of Cure by Extraction Method

The weight percent (%) extractable silicone in the release coating, which can be taken as an indicator of the extent of cure, was determined by calculating the % change in the silicone release coating weight before and after extraction with methyl isobutyl ketone (MIBK) for five minutes. The silicone release coating weights were determined by X-Ray fluorescence spectrometry as described above. The % extractable silicone was calculated as follows:

$$[(a-b)/a]*100=\% \text{ extractables}$$

where a=initial coating before extraction with MIBK; and b=final coating after extraction with MIBK.

Adhesive Test Tape Preparation

The following components were mixed together: 95 parts IOA and 5 parts AA. A plastic pouch (ethylene-vinyl acetate copolymer) was filled with this mixture, sealed shut, and the filled pouch was exposed to a UV-A irradiation using a blacklight to completely polymerize the adhesive. The pouch and contents were then fed into a counter-rotating 34 millimeter twin-screw extruder (Leistritz, Somerset, N.J.) at 149° C. (300° F.). About 33 parts of FORAL 85 per hundred parts adhesive pouch were also added to the extruder. The resulting composition was hot melt coated onto the silicone treated surface of an olefin liner, exposed to electron beam (E-beam) irradiation (9 MegaRads dosage at a voltage of 210 kiloelectron volts) to crosslink the adhesive, then covered with a second, treated olefin liner. The glass transition temperature ($T_g$) of the resulting adhesive was 19° C. Later, the resulting article was used to transfer laminate the adhesive layer to Primed Polyester Film on its primed surface to provide a single coated Adhesive Test Tape without any protective cover film.

Release Force of Adhesive Test Tape from Release Liner

The release force between the release liner and the Adhesive Test Tape of a laminate construction was measured using a 180-degree peel geometry according to the manufacturer's instructions as follows. An IMASS SP 2100 peel force tester (IMASS, Incorporated, Accord, Mass.) equipped with a 5.0-pound (2.27-kg) load cell was employed using the following parameters: a 1 inch (2.54 centimeters) wide test specimen, a peel rate of 90 inches/minute (229 cm/min), a two second delay before data acquisition, and a five second averaging time. The average of two test specimens was reported in grams/inches. Testing was done according to the following conditions.

A) Seven days at 22° C. (72° F.) and 50% Relative Humidity
B) Seven days at 50° C., followed by an equilibration at 22° C. (72° F.) and 50% Relative Humidity for a minimum of 24 hours before testing.

Peel Adhesion Strength of Adhesive Test Tape

The peel adhesion strengths of the Adhesive Test Tape from a glass panel was measured at 72° F. (22° C.) and 50% Relative Humidity, and were designated as Peel Adhesion Strength 1 and 3. In addition, a second sample of the Adhesive Test Tape was first laminated to the release liner such that it contacted the release coating layer and exposed to various conditions as noted in the Release Force of Adhesive Test Tape from Release Liner test method, then evaluated for release force. Upon removal of the Adhesive Test Tape from the release liner the Tape was evaluated for its Peel Adhesion Strength as before, with this result being designated as Peel Adhesion Strength 2 and 4.

Testing was done immediately after removal of the Adhesive Test Tape from the release liner (within one minute) and applying the test tape to a clean glass plate using a 5 lb (2.3 kg) roller. An IMASS SP 2100 Slip/Peel Tester (IMASS, Incorporated, Accord, Mass.) equipped with a 10 pound (4.54 kg) load cell was employed using the following parameters: one inch (2.54 cm) wide test specimen, peel rate of 90 inches/minute (229 cm/min), two second delay before data acquisition, 180 peel geometry, and a ten second averaging time. The average of two test specimens was reported in grams/inches (g/cm).

Preparation of 1-(1,1,2,2,3,3,4,4,4-Nonafluorobutyl-sulfonyl)Piperazine

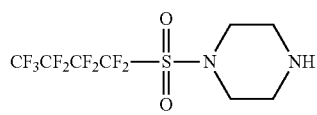

To a 3-neck 3 L round bottom equipped with a mechanical stirrer, addition funnel and a Claisen adaptor with thermocouple and reflux condenser was added piperazine (486 g, 5642 mmol) and triethylamine (400 mL, 2870 mmol). The reaction mixture was heated to 65° C. with continuous stirring. Once the reaction mixture reached 50° C., 1,1,2,2, 3,3,4,4,4-nonafluorobutane-1-sulfonyl fluoride (500 mL, 2780 mmol) was added via addition funnel at such a rate so as to maintain a temperature below 90° C. Upon completion of addition, the temperature was raised to 95° C. and the reaction mixture was allowed to stir for 16 hr. The vessel was cooled to 50° C. and water (300 mL) was added followed by dichloromethane (500 mL). The resulting biphasic mixture was allow to stir for 5 min and then allowed to phase separate. The lower phase was removed, washed 3× with water (300 mL), brine (500 mL), and dried over sodium sulfate (250 g). The resulting yellow solution was filtered, solvent was removed via rotary evaporator and distilled at 250 mTorr and 80° C. to afford 713 g of 1-(1,1,2,2,3,3,4,4,4-nonafluorobutylsulfonyl)piperazine as a white solid.

Preparation of Fluoro Additive 1 Precursor (FA1P)

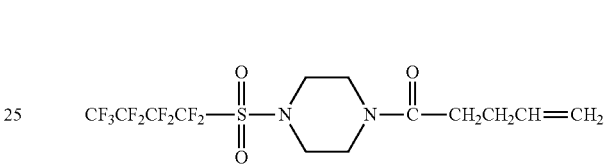

1-(1,1,2,2,3,3,4,4,4-nonafluorobutylsulfonyl)piperazine (185.7 g, 504 mmol, 1.01 equivalents), pent-4-enoic acid (50 g, 499 mmol, 1 equivalent), and mesitylene (125 mL) were added to a 1 L round bottom flask equipped with a magnetic stir bar, Dean-Stark trap, and reflux condenser. The reaction mixture was slowly heated to 140° C. and held for 30 minutes, then to 200° C. in 10° C. intervals over a period of 3 hours with slow evolution of water. The temperature was maintained at 200° C. for 12 hours. The mixture was then cooled to afford, without further purification, 1-(4-((perfluorobutyl)sulfonyl)piperazin-1-yl)pent-4-en-1-one (225 g, FA1P) as a white solid.

Preparation of Fluoro Additive 6 Precursor (FA6P)

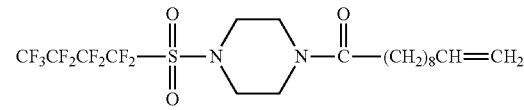

1-(1,1,2,2,3,3,4,4,4-nonafluorobutylsulfonyl)piperazine (84.22 g, 228.7 mmol, 1.01 equivalents), undecen-10-enoic acid (41.7 g, 226.4 mmol, 1 equivalent), and mesitylene (10 mL) were added to a 250 mL round bottom flask equipped with a magnetic stir bar, dean-stark trap and reflux condenser. The reaction mixture was slowly heated to 140° C., the temperature was held for 30 minutes and then raised to 200° C. in 10° C. intervals over a period of 3 hours with slow evolution of water. The temperature was maintained at 200° C. for 12 hours. The mixture was cooled to afford, without further purification, 1-(4-((perfluorobutyl)sulfonyl)piperazin-1-yl)undec-10-en-1-one (120 g, FAP6) as a dark brown solid.

Example 1

Preparation of Fluoro Additive 1 (FA1)

5-(1,1,3,3,5,5,5-heptamethyltrisiloxanyl)-1-(4-((perfluorobutyl)sulfonyl)piperazin-1-yl)pentan-1-one

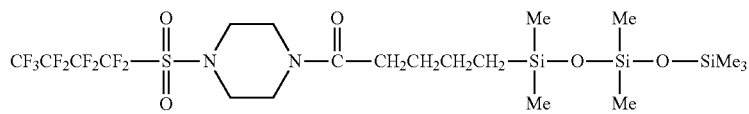

The following were added to a 5 L, 3-neck round bottom flask equipped with a magnetic stir bar, thermocouple, reflux condenser, and an addition funnel: 900 g (2 mol, 1 equivalent) of FA1P, 100 g (10 mmol of Pt) of Karstedt's Catalyst solution, and 1 L of toluene. Next, 550 g (2.47 mol, 1.24 equivalents) of HPMTS was added with vigorous stirring via the addition funnel at a rate such that the temperature did not exceed 45° C. The resulting dark colored solution was allowed to stir at 23° C. for 18 hours after which solvent and excess reagent were removed under vacuum with the aid of a rotary evaporator to afford, without further purification, 1.34 kg of 5-(1,1,3,3,5,5,5-heptamethyltrisiloxanyl)-1-(4-((perfluorobutyl)sulfonyl)piperazin-1-yl)pentan-1-one (FA1) as a dark oil.

Example 2

Preparation of Fluoro Additive 2 (FA2)

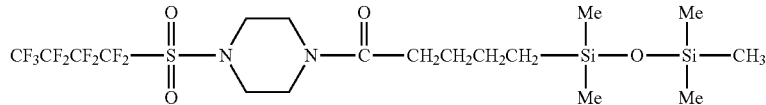

FA2 was prepared in the same manner as FA1, with the following modifications: a 500 mL round bottom flask was used, 20 g (44.4 mmol, 1 equivalent) of FA1P, 0.0855 g (8.8 micromoles of Pt) of Karstedt's catalyst solution, 22 mL of toluene, and 7.9 g (53.3 mmol, 1.2 equivalents) of PTDMS were combined to afford, without further purification, 26.6 g of 5-(1,1,3,3,3-pentamethyldisiloxanyl)-1-(4-((perfluorobutyl)sulfonyl)piperazin-1-yl)pentan-1-one (FA2) as a dark oil.

Example 3

Preparation of Fluoro Additive 3 (FA3)

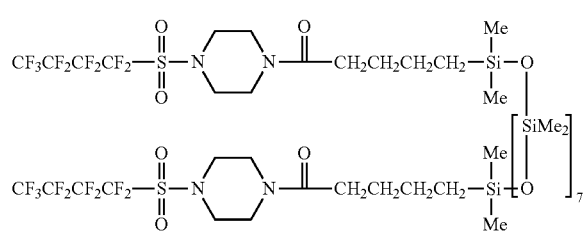

FA3 was prepared in the same manner as FA2, with the following modification. 9.6 g (22.2 mmol, 0.5 equivalent) of HTPDS400 was used in place of PTDMS to afford, without further purification, 29.6 g of 5,5'-(HTPDS400)bis(1-(4-((perfluorobutyl)sulfonyl)piperazin-1-yl)pentan-1-one) (FA3) as a dark solid.

Example 4

Preparation of Fluoro Additive 4 (FA4)

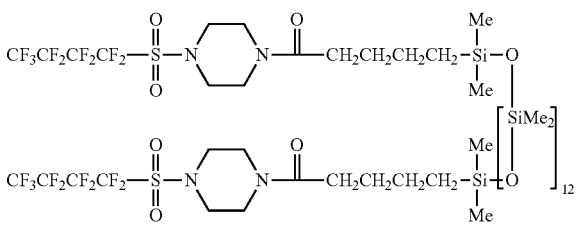

FA4 was prepared in the same manner as FA2, with the following modification. 22.7 g (22.2 mmol, 0.5 equivalent) of HTPDS1000 was used in place of PTDMS to afford, without further purification, 42.7 g of 5,5'-(HTPDS1000)bis(1-(4-((perfluorobutyl)sulfonyl)piperazin-1-yl)pentan-1-one) (FA4) as a dark solid.

Example 5

Preparation of Fluoro Additive 5 (FA5)

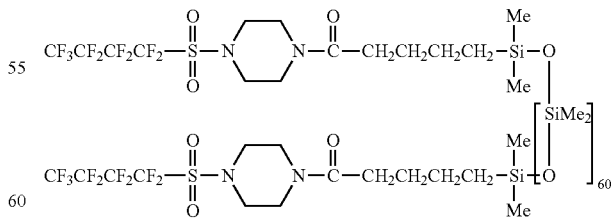

FA5 was prepared in the same manner as FA2, with the following modifications. 2.0 g (4.44 mmol, 1 equivalent) of FA1P, 0.00855 g (0.88 micromoles of Pt) of Karstedt's catalyst solution, 22.2 mL of toluene, and 10.1 g (2.22 mmol, 0.5 equivalent) of HTPDS4000 were used to afford, without further purification, 12.1 g of 5,5'-(HTPDS4000)bis (1-(4-((perfluorobutyl)sulfonyl)piperazin-1-yl)pentan-1-one) (FA5) as a dark oil.

Example 6

Preparation of Fluoro Additive 6 (FA6)

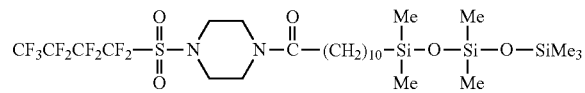

FA6 was prepared in the same manner as FA2, with the following modifications. 11.8 g (22.2 mmol, 1 equivalent) of FA6P, 0.043 grams (4.4 micromoles of Pt) of Karstedt's catalyst solution, 11 mL of toluene, and 6.13 g (26.6 mL, 1.24 equivalents) of HPMTS were employed to afford, without further purification, 17.9 g of 11-(1,1,3,3,5,5,5-heptamethyltrisiloxanyl)-1-(4-((perfluorobutyl)sulfonyl)piperazin-1-yl)undecan-1-one (FA6) as a dark solid.

Example 7

Preparation of Fluoro Additive 7 (FA7)

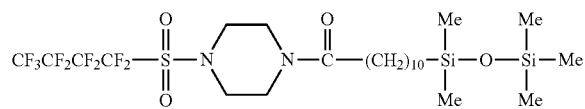

FA7 was prepared in the same manner as FA6, with the following modification. 4.16 g (26.6 mmol, 1.24 equivalents) of PTDMS was used in place of HPMTS to afford, without further purification, 15.7 g of 11-(1,1,3,3,3-pentamethyldisiloxanyl)-1-(4-((perfluorobutyl)sulfonyl)piperazin-1-yl)undecan-1-one (FA7) as a dark solid.

Example 8

Preparation of Fluoro Additive 8 (FA8)

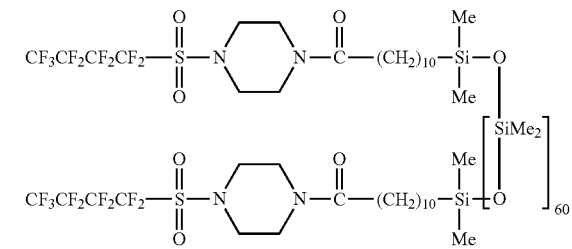

FA8 was prepared in the same manner as FA6, with the following modification. 5.05 g (1.11 mmol, 0.5 equivalent) of HTPDS4000 was used in place of HPMTS to afford, without further purification, 16.9 g of 11,11'-(HTPDS4000)-1-(4-((perfluorobutyl)sulfonyl)piperazin-1-yl)undecan-1-one (FA8) as a dark oil.

Example 9

Preparation of Fluoro Additive 9 (FA9)

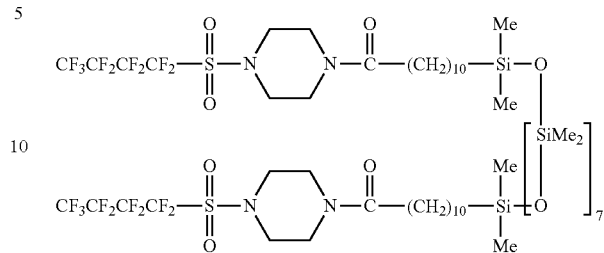

FA9 was prepared in the same manner as FA6, with the following modification. 4.8 g (11.1 mmol, 0.5 equivalent) of HTPDS400 was used in place of HPMTS to afford, without further purification, 16.6 g of 11,11'-(HTPDS400)-1-(4-((perfluorobutyl)sulfonyl)piperazin-1-yl)undecan-1-one (FA9) as a dark solid.

Example 10

Preparation of Fluoro Additive 10 (FA10)

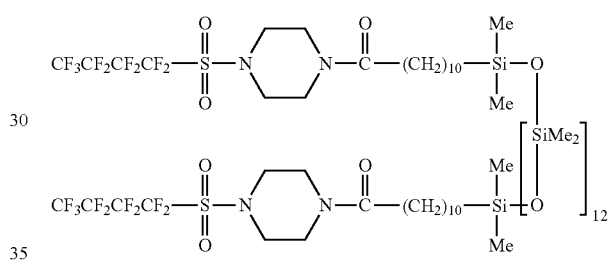

FA10 was prepared in the same manner as FA6, with the following modification. 11.36 g (11.1 mmol, 0.5 equivalent) of HTPDS1000 was used in place of HPMTS to afford, without further purification, 23 g of 11,11'-(HTPDS1000)-1-(4-((perfluorobutyl)sulfonyl)piperazin-1-yl)undecan-1-one (FA10) as a dark solid.

Examples 11 and 12

The following were combined in ajar and mixed to give a homogeneous solution: 100 grams of VTSP, 2.54 grams HFSX at a hydride:vinyl ratio of 1.2:1, and either 2.1 grams (2 weight percent) or 4.28 grams (4 weight percent) of FA1. This solution was coated at 100 weight percent solids onto the primed side of Primed Polyester Film using a five roll coating station. The silicone coating was then cured in an oven at 127° C. (260° F.) for 12 seconds. Coating weights of approximately 2.0 grams/square meter were obtained with less than 5 weight percent extractables. The coated, cured release liners thus obtained were stored for one week at 22° C. (72° F.) and 50% relative humidity) before exposure to electron beam (e-beam) irradiation.

Next, the coated, cured release liner was exposed to e-beam radiation on the side having the release coating composition which contained FA1. An ELECTROCURTAIN CB-300 E-beam unit (Energy Sciences Incorporated, Wilmington, Mass.) was employed, the accelerating voltage was 210 kiloelectron volts, and a dose of 9 megaRads was provided. The oxygen concentration in the nitrogen-inerted E-beam chamber was maintained between 8-15 ppm oxygen as measured by an Alpha Omega Series 3000 Trace Oxygen Analyzer (Alpha Omega Instruments Corporation, Lincoln, R.I.). The E-beam treated release liner was then immediately (within 30 seconds) laminated to the Adhesive Test Tape by hand using a rubber roller to ensure intimate contact. In this way, the adhesive of the Adhesive Test Tape was in direct contact with the cured, E-beam treated release coating of the release liner. The resulting laminate construction was then evaluated for release force, as well as the peel adhesion strength of the Adhesive Test Tape both before lamination, and after lamination to the release liner followed by exposure to various conditions, as described in the test methods above.

Comparative Example A

Example 11 was repeated with the following modification. FA1 was not used.

Examples 11 and 12, and Comparative Example A were tested according to the RELEASE FORCE OF ADHESIVE TEST TAPE FROM RELEASE LINER and PEEL ADHESION STRENGTH OF ADHESIVE TEST TAPE procedures. Results are reported in Table 1, below. Peel Adhesion Strength 1 of the test tape from glass was 3024 grams/inch (1191 g/cm).

TABLE 1

| EXAMPLE | DESCRIPTION | RELEASE FORCE, grams/inch (g/cm) | | PEEL ADHESION STRENGTH 2, grams/inch (g/cm) | |
|---|---|---|---|---|---|
| | | Condition A | Condition B | Condition A | Condition B |
| Comparative Example A | 0% FA1 | 902 (355) | 1069 (421) | 2779 (1094) | 3010 (1185) |
| 11 | 2% FA1 | 108 (42.5) | 246 (96.9) | 3170 (1248) | 3316 (1306) |
| 12 | 4% FA1 | 111 (43.7) | 188 (74.0) | 3179 (1252) | 3232 (1347) |

Examples 13-24

The following were combined in ajar and mixed to give a homogeneous solution: 9.72 grams of VTSP, 0.278 grams HFSX at a hydride:vinyl ratio of 1.35:1, 28.36 grams of heptane, 7.09 grams of methyl ethyl ketone and either 0.044 grams (2 weight percent) or 0.088 grams (4 weight percent) of FA1, FA2, FA4, FA6, FA7 or FA10. The solutions were coated at 22 weight percent solids onto the primed side of Primed Polyester Film using a #8 Meyer Rod (0.72 mil (18 microns) nominal wet film thickness). The silicone coating was then cured in an oven at 120° C. for 2 minutes. Coating weights of approximately 2.0 grams/square meter were obtained with less than 5 weight percent extractables. The coated, cured release liners thus obtained were stored for one week at 22° C. (72° F.) and 50% relative humidity) before exposure to electron beam (E-beam) irradiation.

Next, the coated, cured release liner was exposed to e-beam radiation on the side having the release coating composition which contained FA1, FA2, FA4, FA6, FA7 or FA10. An ELECTROCURTAIN CB-300 E-beam unit (Energy Sciences Incorporated, Wilmington, Mass.) was employed, the accelerating voltage was 210 kiloelectron volts, and a dose of 9 megaRads was provided. The oxygen concentration in the nitrogen-inerted E-beam chamber was maintained between 8-15 ppm oxygen as measured by an Alpha Omega Series 3000 Trace Oxygen Analyzer (Alpha Omega Instruments Corporation, Lincoln, R.I.). The E-beam treated release liner was then immediately (within 30 seconds) laminated to the Adhesive Test Tape by hand using a rubber roller to ensure intimate contact. In this way, the adhesive of the Adhesive Test Tape was in direct contact with the cured, E-beam treated release coating of the release liner. The resulting laminate construction was then evaluated for release force, as well as the peel adhesion strength of the Adhesive Test Tape both before lamination, and after lamination to the release liner followed by exposure to various conditions, as described in the test methods above.

Comparative Example B

Example 13 was repeated with the following modification. FA1 was not used.

Examples 13-24, and Comparative Example B were tested according to the RELEASE FORCE OF ADHESIVE TEST TAPE FROM RELEASE LINER and PEEL ADHESION STRENGTH OF ADHESIVE TEST TAPE procedures. Results are reported in Table 2, below, wherein Peel Adhesion Strength 3 of the test tape from glass was 3515.3 grams/inch (1384 g/cm).

TABLE 2

| EXAMPLE | DESCRIPTION | RELEASE FORCE, grams/inch (g/cm) | | PEEL ADHESION STRENGTH 4, grams/inch (g/cm) | |
|---|---|---|---|---|---|
| | | Condition A | Condition B | Condition A | Condition B |
| Comparative Example B | 0% FA1 | 662 (261) | 412 (162) | 3185 (1254) | 3165 (1246) |
| 13 | 2% FA1 | 59 (23) | 58 (23) | 3437 (1353) | 3626 (1428) |

TABLE 2-continued

| | | RELEASE FORCE, grams/inch (g/cm) | | PEEL ADHESION STRENGTH 4, grams/inch (g/cm) | |
|---|---|---|---|---|---|
| EXAMPLE | DESCRIPTION | Condition A | Condition B | Condition A | Condition B |
| 14 | 4% FA1 | 38 (15) | 48 (19) | 3447 (1357) | 3615 (1423) |
| 15 | 2% FA2 | 81 (32) | 70 (27) | 3449 (1358) | 3486 (1372) |
| 16 | 4% FA2 | 48 (19) | 52 (20) | 3381 (1331) | 3246 (1278) |
| 17 | 2% FA4 | 57 (22) | 67 (26) | 3235 (1273) | 3589 (1413) |
| 18 | 4% FA4 | 43 (17) | 52 (20) | 3263 (1285) | 3525 (1388) |
| 19 | 2% FA6 | 51 (20) | 58 (23) | 3393 (1336) | 3627 (1428) |
| 20 | 4% FA6 | 21 (8) | 34 (13) | 3293 (1296) | 3589 (1413) |
| 21 | 2% FA7 | 73 (29) | 63 (25) | 3515 (1384) | 3644 (1435) |
| 22 | 4% FA7 | 23 (9) | 22 (9) | 3345 (1317) | 3427 (1349) |
| 23 | 2% FA10 | 79 (31) | 83 (32) | 3206 (1262) | 3595 (1415) |
| 24 | 4% FA10 | 78 (31) | 77 (30) | 3324 (1309) | 3340 (1315) |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A method of making an adhesive article, the method comprising:
   providing a backing having first and second opposed major surfaces, wherein a first silicone release layer is disposed on the first major surface, wherein a second silicone release layer is disposed on the second major surface, and wherein the second silicone release layer further comprises a compound represented by the formula:

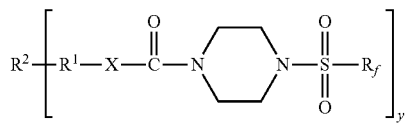

wherein
   $R^1$ represents a divalent hydrocarbon radical having from 2 to 40 carbon atoms or covalent bond;
   $R^2$ represents a monovalent or divalent poly(dimethylsiloxane) moiety;
   X represents —NH— or a covalent bond;
   $R_f$ represents a perfluorinated group having from 3 to 5 carbon atoms; and
   y is 1 or 2;
   disposing an adhesive layer onto the first silicone release layer; and
   exposing at least the adhesive layer to electron beam radiation within a process chamber thereby providing a crosslinked adhesive layer, wherein the process chamber contains oxygen, wherein the second silicone release layer is exposed to the oxygen during crosslinking of the adhesive layer.

2. The method of claim 1, wherein the electron beam radiation is directed from opposing directions at both the adhesive layer and the second silicone release layer, respectively.

3. The method of claim 1, further comprising winding the crosslinked adhesive layer onto the second silicone release layer.

4. The method of claim 1, wherein the crosslinked adhesive layer is a pressure-sensitive adhesive layer.

5. An adhesive article made according to the method of claim 3.

6. An adhesive article comprising:
   a backing having first and second opposed major surfaces, wherein a first silicone release layer is disposed on the first major surface, wherein a second silicone release layer is disposed on the second major surface, and wherein the second silicone release layer further comprises a compound represented by the formula:

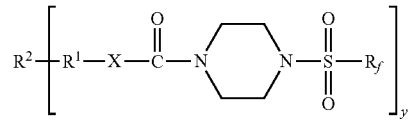

wherein
   $R^1$ represents a divalent hydrocarbon radical having from 2 to 40 carbon atoms or covalent bond;
   $R^2$ represents a monovalent or divalent poly(dimethylsiloxane) moiety;
   X represents —NH— or a covalent bond;
   $R_f$ represents a perfluorinated group having from 3 to 5 carbon atoms; and
   y is 1 or 2; and
   an adhesive layer sandwiched between the first and second silicone release layers.

7. The adhesive article of claim 6, wherein $R_f$ is perfluorobutyl.

8. The adhesive article of claim 6, wherein $R^1$ has 6 carbon atoms and is aromatic.

9. The adhesive article of claim 6, wherein $R^1$ has from 2 to 12 carbon atoms.

10. The adhesive article of claim 6, wherein $R^2$ is a divalent poly(dimethylsiloxane) moiety.

11. The adhesive article of claim 6, wherein the adhesive layer is a pressure-sensitive adhesive layer.

12. A compound represented by the formula:

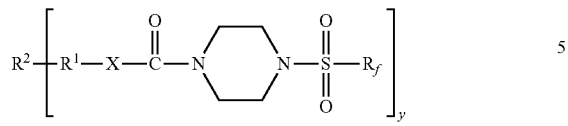

wherein
- $R^1$ represents a divalent hydrocarbon radical having from 2 to 40 carbon atoms or covalent bond;
- $R^2$ represents a monovalent or divalent poly(dimethylsiloxane) moiety;
- X represents —NH— or a covalent bond;
- $R_f$ represents a perfluorinated group having from 3 to 5 carbon atoms; and
- y is 1 or 2.

13. The compound of claim 12, wherein $R_f$ is perfluorobutyl.

14. The compound of claim 12, wherein $R^1$ has 6 carbon atoms and is aromatic.

15. The compound of claim 12, wherein $R^1$ has from 2 to 12 carbon atoms.

16. The compound of claim 12, wherein $R^2$ is a divalent poly(dimethylsiloxane) moiety.

* * * * *

UNITED STATES PATENT AND TRADEMARK OFFICE
CERTIFICATE OF CORRECTION

PATENT NO. : 10,731,054 B2  
APPLICATION NO. : 16/312544  
DATED : August 4, 2020  
INVENTOR(S) : Maria Appeaning Page 1 of 1

It is certified that error appears in the above-identified patent and that said Letters Patent is hereby corrected as shown below:

On the Title Page

<u>First Column</u>
(72) Inventors:, Delete "Maria A. Boulos," and insert -- Marie A. Boulos, --, therefor.

In the Specification

<u>Column 6</u>
Line 1, Delete "hydrosilation-based)," and insert -- hydrosilylation-based), --, therefor.

<u>Column 11</u>
Line 34, Delete "ethyloxyethoxyethyl" and insert -- ethoxyethoxyethyl --, therefor.

<u>Column 22</u>
Line 45, Delete "ajar" and insert -- a jar --, therefor.

<u>Column 23</u>
Line 35, Delete "ajar" and insert -- a jar --, therefor.

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*